(12) United States Patent
Paul

(10) Patent No.: US 10,087,830 B2
(45) Date of Patent: Oct. 2, 2018

(54) SWITCHING VALVE AND INTERNAL COMBUSTION ENGINE

(71) Applicant: Dr. Ing. h.c. F. Porsche Aktiengesellschaft, Stuttgart (DE)

(72) Inventor: Michael Paul, Weissach (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 83 days.

(21) Appl. No.: 15/198,166

(22) Filed: Jun. 30, 2016

(65) Prior Publication Data
US 2017/0002732 A1   Jan. 5, 2017

(30) Foreign Application Priority Data

Jul. 2, 2015   (DE) .................. 10 2015 110 664

(51) Int. Cl.
*F15B 13/02*   (2006.01)
*F02B 75/04*   (2006.01)
(Continued)

(52) U.S. Cl.
CPC ............. *F02B 75/045* (2013.01); *F16C 7/06* (2013.01); *F16K 11/0704* (2013.01); *F16K 11/0712* (2013.01)

(58) Field of Classification Search
CPC ...... F02B 75/045; F16C 7/06; F16K 11/0704; F16K 11/0712
(Continued)

(56) References Cited

U.S. PATENT DOCUMENTS 3,354,911 A * 11/1967 Fall .................... F15B 13/04
                                                       137/625.69
4,148,518 A *  4/1979 Vilbeuf .................. B60N 2/502
                                                       296/65.02
(Continued)

FOREIGN PATENT DOCUMENTS

DE   102010016037   9/2011
DE   102012112461   6/2014
(Continued)

OTHER PUBLICATIONS

Japanese Office Action with English language translation for Application No. 2016-127266, dated May 23, 2017, 15 pages.
(Continued)

*Primary Examiner* — Marguerite McMahon
(74) *Attorney, Agent, or Firm* — RatnerPrestia

(57) ABSTRACT

A switching valve for an internal combustion engine having an adjustable compression ratio. The switching valve includes a switching element having a groove, and a sleeve-shaped connecting section, which has a first bore, which connects the switching valve with a first hydraulic fluid line, a second bore, which connects the switching valve with a second hydraulic fluid line, and a venting bore, which connects the switching valve to a venting duct. The switching element is guided so as to be movable in the connecting section by forming a gap between the surface of the switching element and a corresponding guide face of the connecting section. In a first switched position of the switching valve, the groove connects the first hydraulic fluid line to a venting duct. In a second switched position, the groove connects the second hydraulic fluid line to the venting duct.

13 Claims, 4 Drawing Sheets

(51) Int. Cl.
*F16C 7/06* (2006.01)
*F16K 11/07* (2006.01)

(58) Field of Classification Search
USPC ...................................... 123/197.3
See application file for complete search history.

(56) References Cited

U.S. PATENT DOCUMENTS

| | | | | |
|---|---|---|---|---|
| 4,526,201 A * | 7/1985 | Geyler, Jr. | .......... | F15B 13/0403 |
| | | | | 137/625.63 |
| 4,683,914 A * | 8/1987 | Brisland | ................ | F01L 15/08 |
| | | | | 137/625.25 |
| 5,171,025 A * | 12/1992 | Stoll | .................... | F16J 15/3252 |
| | | | | 137/248 |
| 5,988,591 A * | 11/1999 | Akimoto | ............ | F16K 11/0712 |
| | | | | 137/625.69 |
| 5,992,449 A * | 11/1999 | Sprague | ................. | F16K 17/10 |
| | | | | 137/488 |
| 6,408,882 B1 * | 6/2002 | Smith, Jr. | ............... | F16K 11/07 |
| | | | | 137/625.13 |
| 2010/0258210 A1 * | 10/2010 | Miyazoe | ............ | F16K 11/0712 |
| | | | | 137/625.69 |

FOREIGN PATENT DOCUMENTS

| | | |
|---|---|---|
| JP | S5139832 U | 3/1976 |
| JP | H08303618 A | 11/1996 |

OTHER PUBLICATIONS

English translation of Chinese Office Action for Application No. 201610515900.9 dated May 2, 2018, 8 pages.

\* cited by examiner

SWITCHING VALVE AND INTERNAL COMBUSTION ENGINE

CROSS-REFERENCE TO RELATED APPLICATIONS

This application claims priority to German Patent Application No. DE 10 2015 110 664.7, filed Jul. 2, 2015, which is incorporated by reference herein in its entirety.

FIELD OF THE INVENTION

The invention relates to a switching valve and to an internal combustion engine.

BACKGROUND OF THE INVENTION

In internal combustion engines, a high compression ratio has a positive effect on the efficiency of the internal combustion engine. A compression ratio is generally understood to be the ratio of the entire cylinder volume before compression with respect to the remaining cylinder volume after compression. In internal combustion engines with external ignition, in particular in spark ignition engines which generally have a fixed compression ratio, a value for the compression ratio must be selected which is only so high that in the full load operating mode what is referred to as "knocking" of the internal combustion engine is avoided. However, for the much more frequently occurring partial load range of the internal combustion engine, that is to say when there is a small cylinder charge, higher values can be selected for the compression ratio without "knocking" occurring. The important partial load range of an internal combustion engine can be improved if the compression ratio can be set in a variable fashion.

DE 10 2010 016 037 A1, which is incorporated by reference herein, discloses an internal combustion engine with an adjustable compression ratio. A connecting rod which has a pin bearing eye and a big end bearing eye can be connected to a crankshaft via the pin bearing eye, and to a cylinder piston of the internal combustion engine via the big end bearing eye. The connecting rod is assigned an eccentric adjustment device which has an eccentric body and eccentric rods.

The eccentric body which is known from DE 10 2010 016 037 A1, which is incorporated by reference herein, has a piston bolt bore which is arranged eccentrically with respect to a center point of the big end bearing eye and has a center point, wherein the piston bolt bore accommodates a piston bolt. The eccentric adjustment device serves to adjust an effective connecting rod length leff, wherein the distance between the center point of the piston rod bore and a center point of the pin bearing eye is to be understood as the connecting rod length. The eccentric rods of the eccentric adjustment device can be moved in order to rotate the eccentric body and therefore to change the effective connecting rod length leff. Every connecting rod is assigned a piston which is displaceably mounted or guided in a hydraulic chamber. In the hydraulic chambers there is a hydraulic pressure which acts on the pistons which are assigned to the eccentric rods, wherein the movement of the eccentric rods is possible or is not possible depending on the quantity of oil in the hydraulic chambers.

The adjustment of the eccentric adjustment device is initiated by the action of mass forces and load forces of the internal combustion engine which act on the eccentric adjustment device when there is a working stroke of the internal combustion engine. During a working stroke, the directions of action of the forces acting on the eccentric adjustment device change constantly. The adjustment movement is assisted by the pistons which are supplied with hydraulic oil and which act on the eccentric rods, whereby the pistons prevent the eccentric adjustment device from being reset by virtue of varying directions of force of the forces acting on the eccentric adjustment device. The eccentric rods which interact with the pistons are connected to the eccentric body on both sides.

The hydraulic chambers in which the pistons are guided can be supplied or filled with hydraulic oil from the pin bearing eye via hydraulic oil feedlines. Non-return valves prevent the hydraulic oil from flowing back out of the hydraulic chambers into the hydraulic oil feedlines. A switching valve is accommodated in a bore of the connecting rod. The hydraulic chambers are connected via hydraulic oil discharge lines to the bore which accommodates the switching valve. The switched position of the switching valve determines which of the hydraulic chambers is filled with hydraulic oil and which of the hydraulic chambers is emptied, wherein the adjustment direction or rotational direction of the eccentric adjustment device depends on this.

As stated, the hydraulic oil which acts on the pistons, guided in the hydraulic chambers, of the eccentric rods, is fed to the hydraulic chambers from the pin bearing eye via the hydraulic oil feedlines, whereby the connecting rod acts on the crankshaft with the pin bearing eye in such a way that a big end bearing shell is arranged between the crankshaft, specifically a crankshaft bearing pin thereof, and the pin bearing eye.

The hydraulic chambers can be vented via the hydraulic oil discharge lines as a function of the switched position of the switching valve. The adjustment direction or rotational direction of the eccentric adjustment device depends on this.

The switching valve which is known from DE 10 2010 016 037 A1, which is incorporated by reference herein, comprises an activation element, a restoring spring and a control piston.

DE 10 2012 112 461 A1, which is incorporated by reference herein, discloses a switching valve for an internal combustion engine with an adjustable compression ratio according to the preamble of patent claim 1. The switching valve which is disclosed in said document has a switching element and a connecting section, wherein the switching element is guided in the connecting section so as to be moveable between the two switched position by forming a gap between a surface of the switching element and a corresponding guide face of the connecting section. The effectiveness of the switching valve is dependent on the tightness thereof.

Although the adjustment direction or rotational direction of the eccentric adjustment device can already be effectively influenced with the switching valves which are known from the prior art, there is a need for an improved, more effective switching valve.

SUMMARY OF THE INVENTION

An object of the invention is to provide a novel switching valve for an internal combustion engine with an adjustable compression ratio and an internal combustion engine with such a switching valve. The object is achieved by means of a switching valve that is described herein.

According to aspects of the invention, at least one sealing element for sealing the gap, at least in certain sections, between the switching element and the connecting section is formed on the surface of the switching element and/or on the guide face of the connecting section. In this way, the effectiveness of the switching valve can be increased. The switching valve can also be fabricated and mounted easily and requires little installation space.

According to a development of the invention, a sealing element, which runs around the groove of the switching element, is formed on the surface of the switching element. In this way, a good seal and an improvement in the effectiveness of the switching valve can be made available.

Alternatively or additionally, at least one sealing element, which is positioned on one side of the latching grooves formed on the surface of the switching element, when viewed in the axial direction of the switching element, preferably a first sealing element which is positioned on the first side of the latching grooves positioned one next to the other when viewed in the axial direction of the switching element, and a second sealing element, which is positioned on a second side of the latching grooves positioned one next to the other, when viewed in the axial direction of the switching element, are formed on the surface of the switching element. In this way, a good seal and improvement in the effectiveness of the switching valve can be made available.

Alternatively or additionally, a sealing element which is positioned on a side of the first bore and of the hydraulic fluid line, when viewed in the axial direction of the connecting section, and faces away from the venting bore and from the venting duct is formed on the guide surface of the connecting section, and/or a sealing element which is positioned on a side of the second bore and of the second hydraulic fluid line, when viewed in the axial direction of the connecting section, and faces away from the venting bore and from the venting duct, is formed on the guide face of the connecting section. In this way, a good seal and an improvement in the effectiveness of the switching valve can be made available.

Alternatively or additionally, a first sealing element which seals the second bore when the switching element assumes the first switched position, and/or a second sealing element which seals the first bore when the switching element assumes the second switched position, are/is formed on the surface of the switching element or on the guide face of the connecting section. In this way, a good seal and an improvement in effectiveness of the switching valve can be made available.

The internal combustion engine, according to aspects of the invention, with an adjustable compression ratio having a switching valve for an internal combustion engine, which has an adjustable compression ratio, specifically for controlling the flow of hydraulic oil in the hydraulic chambers of an eccentric adjustment device, and having a connecting rod arrangement which has a hydraulically adjustable eccentric adjustment device which is arranged in a big end bearing eye and/or a pin bearing eye and has the purpose of adjusting an effective connecting rod length, wherein an adjustment path of the eccentric adjustment device can be controlled by means of the switching valve.

BRIEF DESCRIPTION OF THE DRAWINGS

Preferred developments of the invention can be found in the following description. Exemplary embodiments of the invention are explained in more detail with reference to the drawing without being restricted thereto. In the drawing.

DETAILED DESCRIPTION OF THE INVENTION

Figure 1:
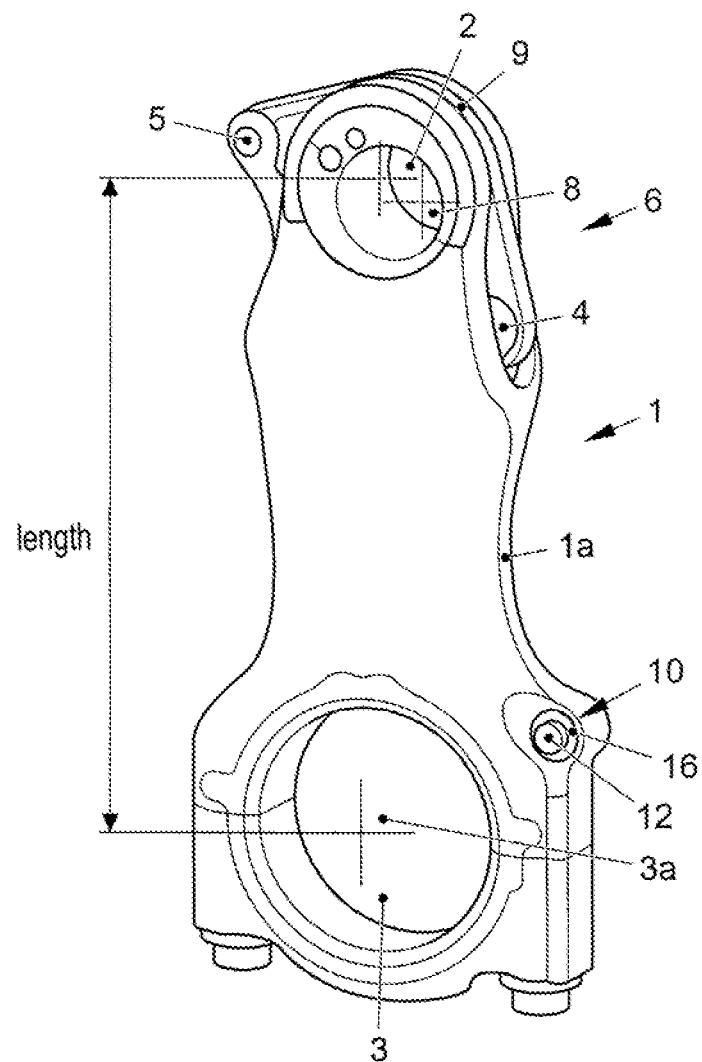
FIG. 1 shows a detail of the internal combustion engine with an adjustable compression ratio, specifically a connecting rod arrangement with a switching valve.

FIG. 1 shows a schematic illustration of a connecting rod arrangement of an internal combustion engine with an adjustable compression ratio. The connecting rod arrangement 1 has a connecting rod 1a and a preferably hydraulically adjustable eccentric device 6 which is arranged, at least in certain sections, in a big end bearing eye 2.

The eccentric device 6 has a piston bolt bore which is arranged eccentrically with respect to the central axis 8 of the big end bearing eye 2 and has a central axis 3a which accommodates a piston bolt. The eccentric device 6 serves to adjust an effective connecting rod length "leff."

The distance of the central axis 8 of the pin bearing eye 3 from the central axis 3a of the piston bolt bearing is defined as the connecting rod length leff.

Rotation of the eccentric device 6 is initiated by the action of mass forces and load forces of the internal combustion engine which act on the eccentric device 6 when there is a working stroke of the internal combustion engine. During a working stroke, the directions of action of the forces acting on the eccentric device 6 change continuously.

The rotational movement or adjustment movement is assisted by pistons which are supplied with hydraulic fluid, in particular with engine oil, and are integrated into the connecting rod arrangement 1, and the pistons prevent the eccentric device 6 from being reset owing to varying directions of force of the forces acting on the eccentric device 6.

The pistons are operatively connected on both sides to an eccentric body 9 of the eccentric device 6 by means of eccentric rods 4, 5. The eccentric device 6 can have the pistons, the eccentric rods 4, 5 and the eccentric body 9. The pistons are supplied with hydraulic fluid from the pin bearing eye 3 via non-return valves (not shown in FIG. 1) via hydraulic fluid lines (not shown in FIG. 1). Said non-return valves prevent in this context the hydraulic fluid from flowing back from the piston volumes of the pistons back into the hydraulic fluid lines into an engine cavity of the internal combustion engine.

The piston volumes are connected to a first hydraulic fluid line 18 and a second hydraulic fluid line 20 which interact with a switching valve 10.

Figure 2:
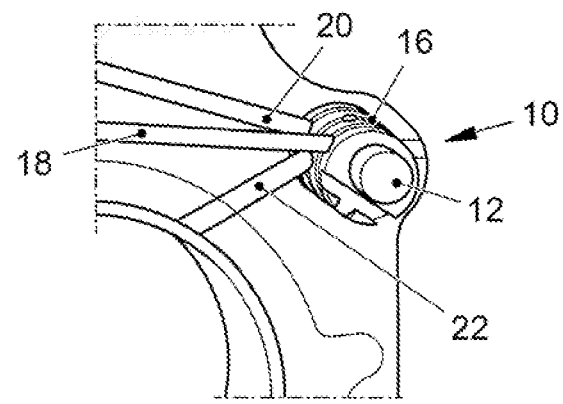
FIG. 2 is a detailed view of FIG. 1 taken in the region of the switching valve.

FIG. 2 shows a schematic view of a detail of the switching valve in the connecting rod arrangement. In FIG. 2, the switching valve 10 is shown in the installed state. The switching valve 10 has a tap element 12 and a sleeve-shaped connecting section 16, wherein the tap element 12 is arranged and movably guided in the sleeve-shaped connecting section 16.

The sleeve-shaped connecting section 16 has a first bore 17 which is connected to the first hydraulic fluid line 18. The sleeve-shaped connecting section 16 also has a second bore 19 which is connected to the second hydraulic fluid line 20. The sleeve-shaped connecting section 16 also has a venting bore 21 which is connected to a venting duct 22.

Figure 3:
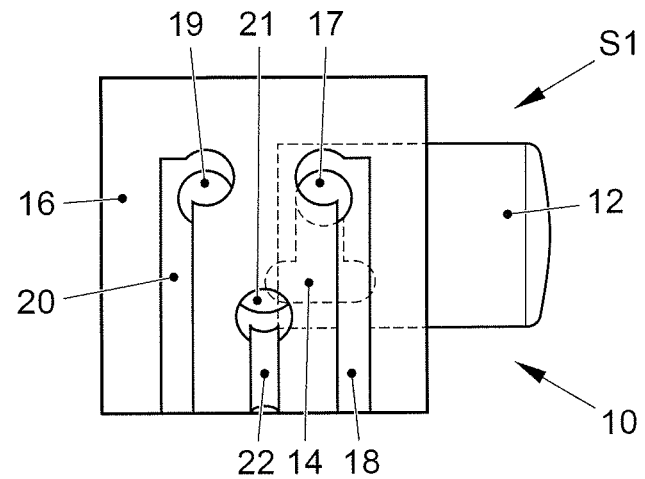
FIG. 3 shows a schematic illustration of the switching valve in a first switched position.

FIG. 3 shows a schematic illustration of the switching valve for controlling the hydraulic fluid flow 10 in a first switched position S1. The switching valve 10 has the tap element 12 and the sleeve-shaped connecting section 16. The tap element 12 is at least partially inserted into the sleeve-shaped connecting section 16. A groove 14 is formed in the surface of the tap element 12. The groove 14 is embodied in a T shape.

The sleeve-shaped connecting section 16 has a first bore 17 which connects the switching valve 10 to the first hydraulic fluid line 18. The sleeve-shaped connecting section 16 also has a second bore 19 which is suitable for connecting the switching valve 10 to the second hydraulic fluid line 20. The sleeve-shaped connecting section 16 also has a venting bore 21 which is suitable for connecting the switching valve 10 to the venting duct 22.

In the first switched position S1, the tap element 12, in particular the groove 14 formed in the surface thereof, is arranged in the region of the first bore 17 and the venting bore 21. The hydraulic fluid line 18 which is connected to the first bore 17 can therefore be vented.

Figure 4:
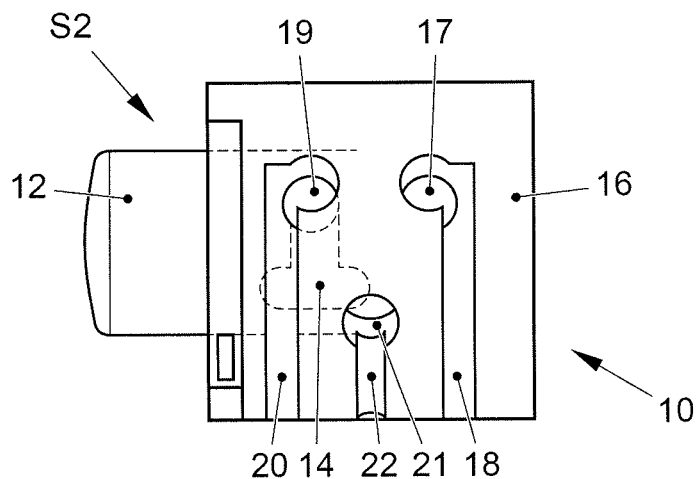
FIG. 4 shows a schematic illustration of the switching valve in a second switched position.

FIG. 4 shows a schematic illustration of the switching valve for controlling the hydraulic fluid flow in a second switched position. In the second switched position S2, the tap element 12, in particular the groove 14 which is formed on the surface thereof, is arranged in the region of the second bore 19 and the venting bore 21. The hydraulic fluid line 20 which is connected to the second bore 19 can therefore be vented.

Figure 5:
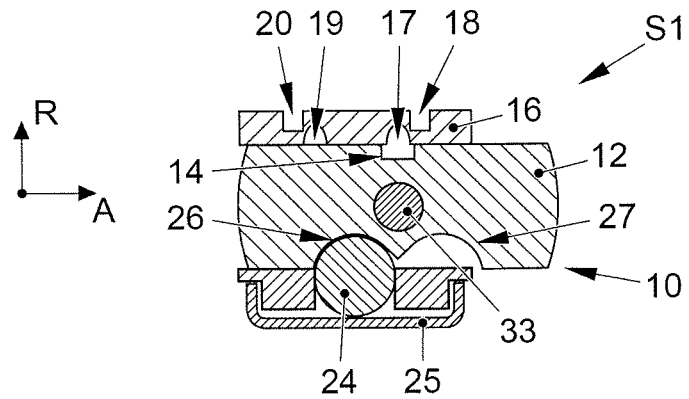
FIG. 5 shows a cross section through the switching valve.

FIG. 5 shows a longitudinal sectional view of the switching valve 10 according to a further preferred exemplary embodiment. FIG. 5 shows the switching valve 10, in particular the tap element 12 arranged in the switching valve 10, in the first switched position S1.

The tap element 12 is preferably secured or locked in the first switched position S1 by means of a latching ball 24 and a spring 25, wherein the latching ball 24 and the spring 25 interact with a latching groove 26 formed in the tap element 12. Overall, two latching grooves 26, 27 are provided. A respective latching groove 26, 27 for accommodating the latching ball 24 is provided for the first and the second switched positions S1, S2 of the switching valve 10.

Accordingly, the switching element 12 can be locked in the first switched position S1 and the second switched position S2, preferably by means of a latching element which is formed by the latching ball 24 and spring 25, in such a way that the latching element engages, as a function of the switched position of the switching element 12, in one of a plurality of latching grooves 26, 27 which are formed on the surface of the switching element 12. The locking of the switching element 12 in the switched positions can also take place in another way.

The latching grooves are positioned one next to the other here when viewed in the axial direction A (see FIG. 5) of the bolt-like or pin-like switching element 12, and are formed on a section of the surface of the switching element 12 which, when viewed in the radial direction R (see FIG. 5) of the switching element 12, lies opposite the section of the surface of the switching element 12 on which the groove 14 is formed.

From FIG. 5 it is also apparent that the hydraulic fluid lines 18, 20 are introduced into the outside of the connecting section 16 of the switching valve 10, wherein the bores 17, 19 extend from the outside to the inside through the connecting section 16, at one end of the hydraulic lines 18, 20.

The switching element 12 of the switching valve 10 is moveably guided in the connecting section 16 thereof, specifically by forming a gap between the surface of the switching element 12 and the corresponding guide face of the connecting section 16.

At least one sealing element for sealing the gap, at least in certain sections, between the switching element 12 and the connecting section 16, is formed on the surface of the switching element 12 which faces the connecting section 16 and/or on the guide face of the connecting section 16 which faces the switching element 12.

According to a first variant, at least one sealing element, which is positioned on one side of the latching grooves 26, 27 formed on the surface of the switching element 12, when viewed in the axial direction A of the switching element 12, is formed on the surface of the switching element 12.

Figure 6:
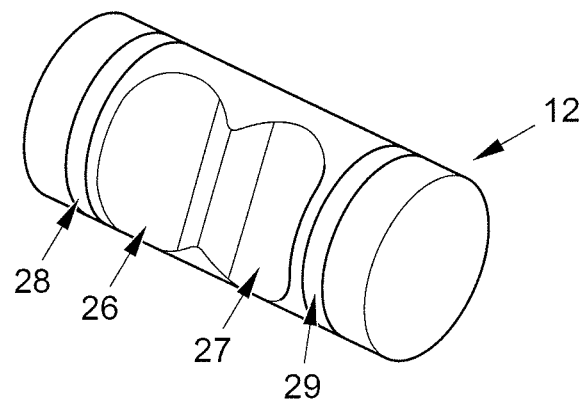
FIG. 6 shows an inventive detail of the switching valve according to a first variant.

For example, FIG. 6 shows that a first sealing element 28, which is positioned on a first side of the latching grooves 26, 27 positioned one next to the other, specifically adjacent to the latching groove 26 or facing away from the latching groove 27, when viewed in the axial direction A of the switching element 12, is formed on the surface of the switching element 12.

In addition, a second sealing element 29, which is positioned on a second side of the latching grooves 26, 27 positioned one next to the other, specifically adjacent to the latching groove 27 or facing away from the latching groove 26, when viewed in the axial direction A of the switching element 12, is formed on the surface of the switching element 12.

Figure 7:
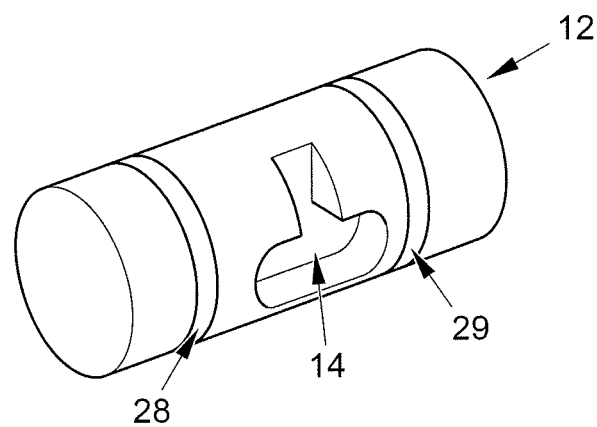
FIG. 7 shows an inventive detail of FIG. 6 in a second perspective.

In this context, the sealing elements 28, 29 are preferably embodied circumferentially when viewed in the circumferential direction of the switching element 12, with the result, that according to FIG. 7 the first sealing element 28 is positioned on the first side of the T-shaped groove 14, when viewed in the axial direction of the switching element 12, and the second sealing element 29 is positioned on the second side of the T-shaped groove 14, when viewed in the axial direction of the switching element 12. The gap between the switching element 12 of the switching valve and connecting section 16 of the switching valve can therefore be sealed effectively.

Figure 8:
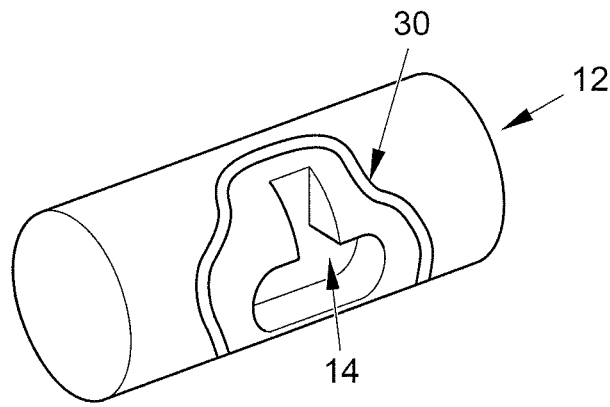
FIG. 8 shows an inventive detail of the switching valve according to a second variant.

According to a second variant of the invention, according to FIG. 8 a sealing element 30, which runs around the T-shaped groove 14 of the switching element 12, is formed on the surface of the switching element 12 of the switching valve. The gap between the switching element 12 of the switching valve and the connecting section 16 of the switching valve can therefore be sealed effectively. The variant in FIG. 8 can also be combined with the variant in FIGS. 6 and 7.

The sealing elements 28, 29, 30 can be O-ring-like sealing elements which are inserted into grooves of the switching element 12 or sealing elements which are vulcanized onto the surface of the switching element 12.

Alternatively or additionally, a sealing element which seals the gap between the switching element 12 and the connecting section 16 can be formed on the guide face of the connecting section 16 in which the switching element 12 is guided.

A first switching element of this type can be positioned on a side of the first bore 17 and of the first hydraulic fluid line 18 which faces away from the venting bore 21 and from the venting duct 22, when viewed in the axial direction of the connecting section 16. A second sealing element of this type can be positioned on a side of the second bore 19 on the second hydraulic fluid line 20 which faces away from the venting bore 21 and from the venting duct 22, when viewed in the axial direction of the connecting section 16. The gap between the switching element 12 and the connecting section 16 can also be sealed effectively in this way.

One variant of the invention (see FIGS. 9, 10 and 11) in which a first sealing element 31 is formed on the surface of the switching element 12 of the switching valve 10 or on the guide face of the connecting section 16 of the switching valve 10 and which seals the second bore 19 when the switching element 12 assumes the first switched position S1 (see FIG. 10) is preferred.

In addition, a second sealing element 32 which seals the first bore 17 when the switching element 12 assumes the second switched position S2 (see FIG. 11) is then formed on the surface of the switching element 12 of the switching valve 10 or on the guide face of the connecting section 16 of the switching valve 10.

When the switching element 12 assumes the first switched position S1 (see FIG. 10), the groove 14 which is formed in the switching element 12 connects the first hydraulic fluid line 18 and therefore the first bore 17 to the venting duct 22, with the result that the second bore 19 is then on the high pressure side and is sealed by means of the first sealing element 31 which seals said bore 19.

When the switching element 12 assumes the second switched position S2 (see FIG. 11), the groove 14 which is formed in the switching element 12 connects the second hydraulic fluid line 20, and therefore the second bore 19, to the venting duct 22, with the result that the first bore 19 is then on the high pressure side and is sealed by means of the second sealing element 32 which seals said bore 19.

The sealing of that bore 17 or 19 of the sleeve-shaped connecting section 16 which is brought about in this way, said bore 17 or 19 being on the high pressure side in the respective switched position of the switching element 12 and accordingly not being coupled to the venting duct 22, is particularly advantageous for improving the effectiveness of the switching valve 10. The respective sealing elements 31 and 32, those of the surface of the switching element 12 in FIGS. 9 to 11, run here, at least in the respective switched position of the switching valve 12, about the bore 17 or 19 which is to be sealed in the respective switched position.

As already stated, the sealing elements 31, 32 can also be formed on the guide face of the connecting section 16.

It is also possible that the entire guide face of the connecting section 16 is provided with a sealing element which is interrupted only by the bores 17, 19.

As already stated, the sealing elements can be O-ring-like sealing elements which are inserted into grooves from the surface of the switching element 12 or into grooves formed on the guide face of the connecting section 16.

In addition, the sealing elements can be sealing elements which are vulcanized onto the surface of the switching element 12 or onto the guide face of the connecting section 16.

Figure 9:
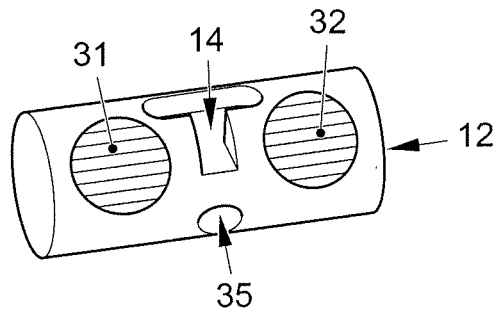
FIG. 9 shows an inventive detail of the switching valve according to a further variant.
Figure 10:
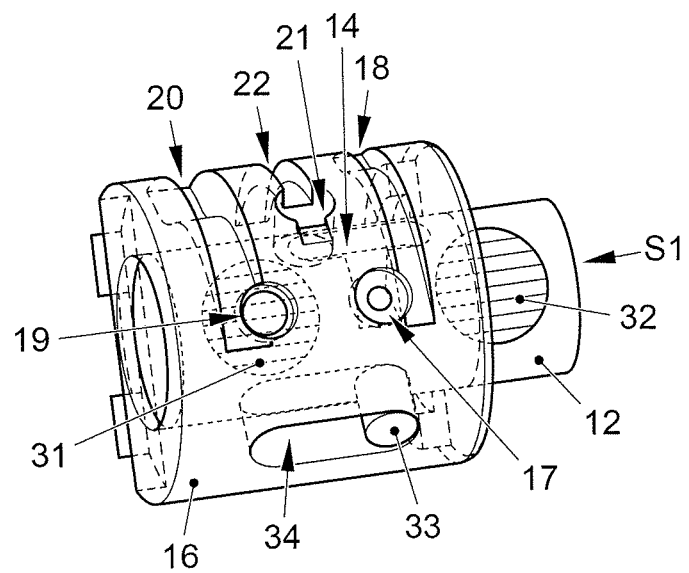
FIG. 10 shows the detail from FIG. 9 together with the sleeve-shaped connecting section in a first switched position of the switching valve.
Figure 11:
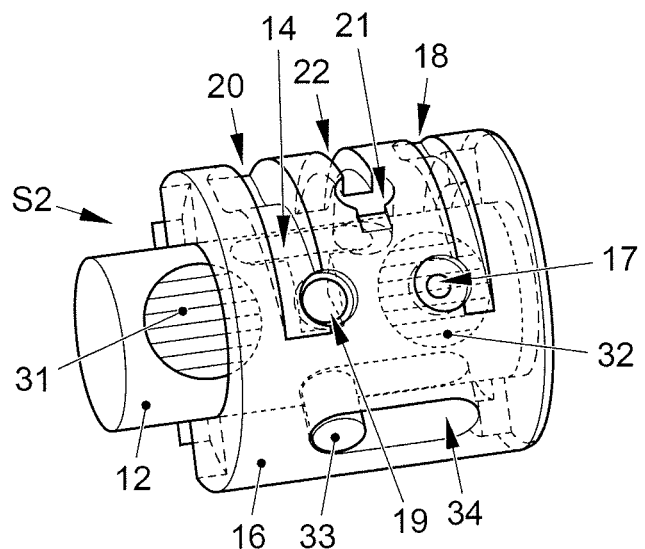
FIG. 11 shows the detail from FIG. 9 together with the sleeve-shaped connecting section in a second switched position of the switching valve.

Furthermore, FIGS. 9 to 11 show a guide element 33 which projects, at a first end, into a corresponding bore 35 of the switching element 12 and which projects, at a second end, into an elongate hole 34 of the connecting section 16. The interplay of the guide element 33 with the elongate hole 34 limits the axial displaceability of the switching element 12 in connecting section 16 and also secures its relative circumferential position in the connecting section 16. The guide element 33 can also be seen in cross section in FIG. 5.

What is claimed is:

1. A switching valve for an internal combustion engine having an adjustable compression ratio for controlling the flow of hydraulic oil in the hydraulic chambers of an eccentric adjustment device, said switching valve comprising:
    a switching element, in a surface of which a groove is formed;
    a sleeve-shaped connecting section, which has a first bore, which connects the switching valve with a first hydraulic fluid line, a second bore, which connects the switching valve with a second hydraulic fluid line, and a venting bore, which connects the switching valve to a venting duct,
    wherein the switching element is guided so as to be movable in the connecting section by forming a gap between the surface of the switching element and a corresponding guide face of the connecting section,
    wherein the switching element is configured to be moved into a first switched position or a second switched position, wherein in the first switched position the groove which is formed in the switching element connects the first hydraulic fluid line to the venting duct, wherein in the second switched position the groove which is formed in the switching element connects the second hydraulic fluid line to the venting duct,
    wherein the switching element is configured to be secured in the first switched position and the second switched position; and
    at least one sealing element for sealing the gap, at least in certain sections, between the switching element and the connecting section, wherein the sealing element encircles the groove.

2. The switching valve as claimed in claim 1, wherein the sealing element extends around the groove and is formed on the surface of the switching element.

3. The switching valve as claimed in claim 1, wherein the groove which is formed in the switching element and latching grooves, which are formed in the switching element, are formed on sections of the surface of the switching element lying opposite one another when viewed in a radial direction.

4. The switching valve as claimed in claim 3, wherein the at least one sealing element, which is positioned on one side of the latching grooves formed on the surface of the switching element, when viewed in an axial direction of the switching element, is formed on the surface of the switching element.

5. The switching valve as claimed in claim 4, wherein a first sealing element, which is positioned on a first side of the latching grooves that are positioned side by side, when viewed in the axial direction of the switching element, is formed on the surface of the switching element, and a second sealing element, which is positioned on a second side of the latching grooves, when viewed in the axial direction of the switching element, is formed on the surface of the switching element.

6. The switching valve as claimed in claim 5, wherein the first sealing element extends around the switching element when viewed in a circumferential direction of the switching element, and is positioned on a first side of the groove when viewed in the axial direction of the switching element, and the second sealing element also extends around the switching element when viewed in the circumferential direction of the switching element, and is positioned on a second side of the groove when viewed in the axial direction of the switching element.

7. The switching valve as claimed in claim 1, wherein a first sealing element, which seals the second bore when the switching element assumes the first switched position, and/or a second sealing element which seals the first bore when the switching element assumes the second switched position are/is between the surface of the switching element and the guide face of the connecting section.

8. The switching valve as claimed in claim 1, wherein a first sealing element, which is positioned on a side of the first bore and of the first hydraulic fluid line, when viewed in an axial direction of the connecting section, faces away from the venting bore and from the venting duct, and
a second sealing element, which is positioned on a side of the second bore and of the second hydraulic fluid line, when viewed in the axial direction of the connecting section, faces away from the venting bore and from the venting duct.

9. The switching valve as claimed in claim 1, wherein the groove of the switching element is embodied in a T-shape.

10. The switching valve as claimed in claim 9, wherein in the first switched position the groove is arranged in a region of the first bore and of the venting bore of the sleeve-shaped connecting section, and in the second switched position said groove is arranged in a region of the second bore and of the venting bore of the sleeve-shaped connecting section, wherein the venting bore is arranged in a region between the first and the second bores of the sleeve-shaped connecting section.

11. The switching valve as claimed in claim 1, wherein the switching element is configured to be locked by a latching ball and a spring in the first switched position or the second switched position, which interact with latching grooves formed on the switching element, wherein the spring is configured to apply a spring tension to the latching ball transversely with respect to a direction of movement of the switching element.

12. An internal combustion engine having an adjustable compression ratio and having a switching valve as claimed in claim 1, the internal combustion engine having a connecting rod arrangement which has a hydraulically adjustable eccentric adjustment device that is arranged in a big end bearing eye and/or a pin bearing eye and adjusts an effective connecting rod length, wherein an adjustment path of the eccentric adjustment device is configured to be controlled by the switching valve.

13. The internal combustion engine as claimed in claim 12, wherein the switching valve is integrated into the connecting rod arrangement.

* * * * *